3,163,145
SOLDER REMOVING TOOL
Raymond A. Duhaime, Shelton, and Clifford S. Lasto, Orange, Conn., assignors to Air-Vac Engineering Company, Incorporated, Milford, Conn., a corporation of Connecticut
Filed Sept. 10, 1963, Ser. No. 307,925
4 Claims. (Cl. 113—59)

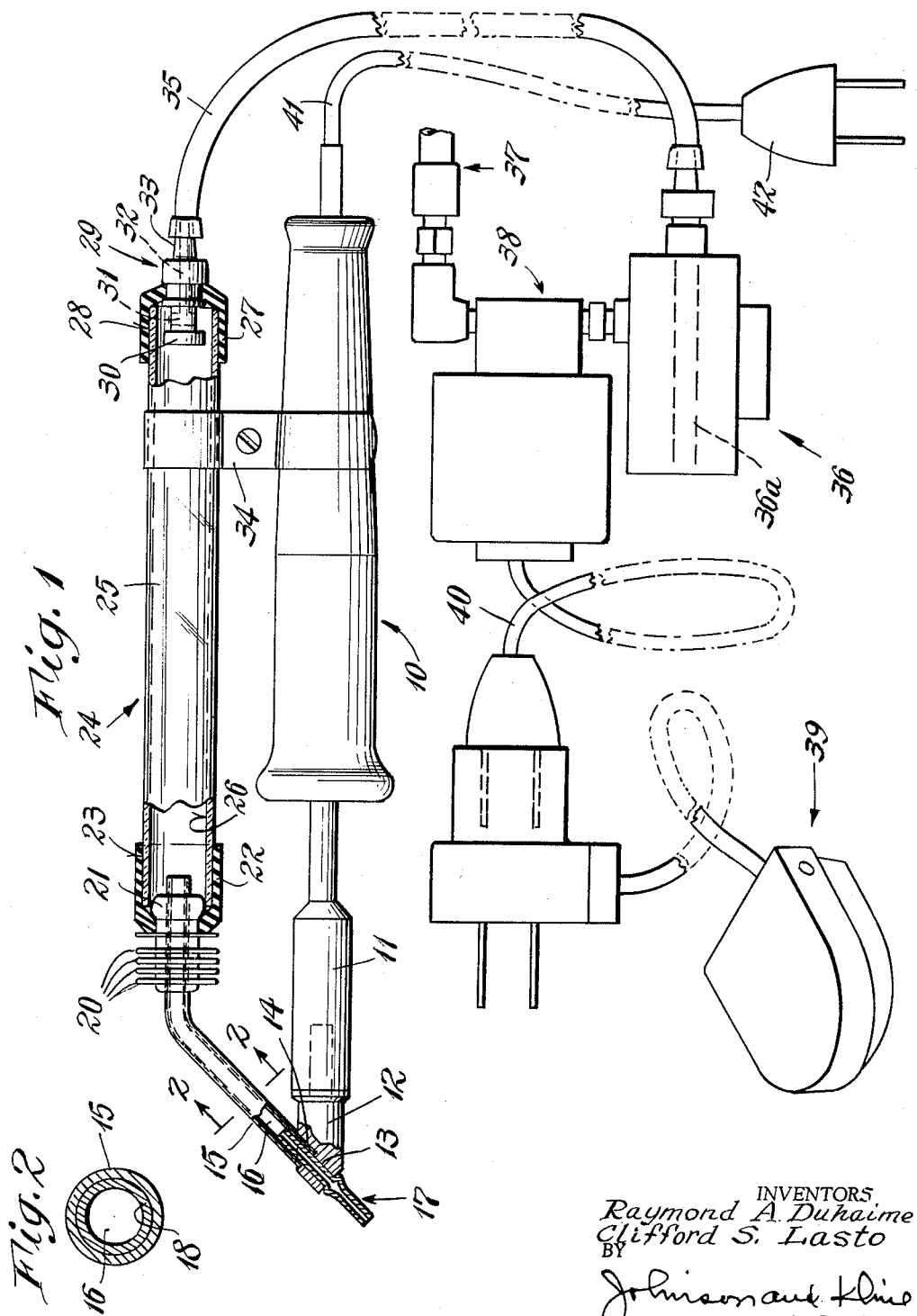

The present invention relates to a device having particular use in removing melted solder from a solder connection.

An object of the present invention is to provide a device which is of simple construction, can be readily assembled and is highly efficient in removing solder, and which can be operated from a remote position by a treadle or the like so that the operator can have his hands free to manipulate the tool and workpiece.

A feature of the invention resides in the simplicity of the device and ease with which the collected solder can be removed.

Another feature of the device resides in the lining of the withdrawal tube with a corrosion resistant material, such as stainless steel, so as to increase the life of the device against the corrosive action of the hot solder passing therethrough.

Other features and advantages of the invention will be apparent from the specification and claims when considered in connection with the accompanying drawings in which:

FIGURE 1 shows the device of the present invention and the operating means therefor.

FIG. 2 is a sectional view taken along line 2—2 of FIG. 1.

As shown in the drawings, the device of the present invention comprises a handle 10 carrying an electric heating means 11 having a heat transmitting portion 12 projecting therefrom. The heat transmitting portion, in the illustrated form of the invention, is provided with a transverse bore 13, preferably an inclined bore as shown in FIG. 1, which opens at its upper end into a socket 14 for receiving a solder withdrawing tube 15. As shown in FIG. 1, the end of the tube 15 abuts in the socket and is positioned by the socket so that the passage 16 in the tube is in alignment with the bore 13 and it is welded in place. A removable tubular tip portion 17 of copper or the like heat transmitting material which can have various internal dimensions in the bore is inserted into the bore 13 and passage 16 and projects below the portion 12 to be in position to be readily moved into engagement with the workpiece. The tube 15 is formed of copper or the like which is a heat transmitting material and is lined with a corrosion resistant liner 18. For example, the liner can be formed of stainless steel. The liner extends for the full length of the tube from the end of the replaceable tip 17 and the tube is bent as shown in FIG. 1 so that the bent end is parallel to the axis of the handle.

Adjacent the other end of the tube there are provided a plurality of radial fins 20 which form a heat disspating unit so that the heat transmitted from the heater will be dissipated prior to reaching a shouldered connector element 21 at the end of the tube. If desired, the portion 12 and connected tube and elements thereof can be given a chrome or nickel plating to the exterior thereof to protect them from oxidation. A receptacle mounting cup 22 of heat resistant elastomeric material, such as silicon rubber, is mounted on the connector 21 and is provided with a cylindrical bore 23 into which one end of a melted solder receptacle 24 is inserted.

While the receptacle may take various forms, in the herein illustrated form of the invention it comprises a cylindrical tube 25 of heat resistant glass having a smooth inner bore 26. The other end of the tube is closed by a cup 27 of resilient elastomeric material such as silicon rubber or neoprene having a cylindrical bore 28 into which the end of the glass tube is inserted to be frictionally engaged thereby. The cup has anchored in the end a connector tube 29. The connector tube has an enlarged head 30 and is provided to the rear of the head with lateral passages 31 connected to a passage 32 in the connector tube. This forms a baffle for retaining the solder in the receptacle. The connector tube has a nipple portion 33 projecting therefrom. Both of the cups 22 and 27 can be readily removed for cleaning the solder from the glass tube.

While the glass tube 24 may be mounted in various ways, it is herein illustrated as being held by a clip 34 or clamping device having one end gripping the handle and the other end gripping the glass tube and holding it in substantially parallel but in spaced relation with the handle so that the handle may be gripped during the operation without interfrence by the glass tube.

A flexible conduit 35 extends from the connector tube 29 to a vacuum transducer 36 of the type disclosed in Patent No. 3,031,127 which is operated by compressed air from a source 37 thereof. The compressed air is controlled by a solenoid valve 38 which is connected to an electrical source by a remote control means. As herein illustrated, this is a pedal 39 to which the solenoid valve is connected by a connector 40.

When it is desired to remove a rejected component from a circuit board or the like, an electric cord 41 having a plug 42 is inserted in an electrical outlet (not shown) and the electric heater is energized. The heat transmitting portion 12 will transmit the heat from the heater to the removable tip 17 and tube 15. The tip is placed in contact with the solder to melt the solder and as soon as the treadle is operated, it causes the air to flow through the vacuum transducer 32 and produce a vacuum which will apply a suction in the solder receiving receptacle. This suction will be transmitted through the tube 15 to the tip and the melted solder is withdrawn. It passes along the lined tube 15 and into the glass tube 24. As the solder passes through the tube 15, it is cooled slightly and when it contacts the smooth wall of the receptacle it hardens. Should small particles of solder pass the baffle formed by the head 30 and passages 31, they can pass through bore 36a in the vacuum transducer without damage thereto.

The glass tube, being transparent, permits the user to see the amount of solder collected therein. When it is desired to remove the collected solder from the receptacle, it is merely necessary to unclamp the receptacle from the handle to remove it from the end caps, thus exposing a straight through bore through which a suitable stiff brush or the like, not shown, can be passed to displace the solder collected therein through the open end of the tube.

While the device has been described as being used to remove melted solder, it is to be understood that the tip 17 can be used to apply small amounts of solder, when the vacuum is not applied thereto, and can be operated thereafter to remove excess solder as may be required.

Thus it will be seen that the device of the present invention is of simple construction and is highly efficient in its operation in removing melted solder from a circuit board or the like. It is light in weight and can be readily handled with one hand while the other hand is free to hold the circuit board to remove the rejected component therefrom since the control of the device is by a pedal operator or other remote control means. Also, the melted solder can be collected in a glass receptacle having a smooth bore, which receptacle can be readily removed from the device for efficient cleaning by a simple cleaning operation.

The device of the present invention has a long life since the solder transmitting passage is lined with a corrosion resistant material which is not attacked by the hot solder as it passes therethrough.

Also, the present invention provides a heat dissipating means on the tube for cooling the tube adjacent the receptacle to cool the solder passing through this portion of the tube and also to prevent transmission of heat into the receptacle.

Variations and modifications may be made within the scope of the claims and portions of the improvements may be used without others.

We claim:

1. A solder removing device comprising a handle carrying a heater means provided with a heat transmitting portion having a bore therein, a copper tube, a removable tubular copper tip inserted at one end of said tube, said tube and tip having portions disposed within the bore of said heat transmitting portion to be heated thereby, said tube having a stainless steel liner therein extending from the tip to the other end thereof, a heat dissipator on the tube adjacent said other end to dissipate heat transmitted along said tube, a tubular heat resistant transparent tube having a smooth bore removably connected to said other end and forming a solder receiving receptacle, means mounting said receptacle on said handle, a source of suction connected to the other end of the receptacle, and control means for selectively controlling the source of suction to apply said suction to the receptacle to withdraw any solder softened by the heated tip through the lined tube and heat dissipator to deposit it in said receptacle.

2. A solder removing device comprising a handle carrying a heater means provided with a heat transmitting portion having a bore therein, a copper tube, a removable tubular copper tip inserted at one end of said tube, said tube and tip having portions disposed within the bore of said heat transmitting portion to be heated thereby, said tube having a stainless steel liner therein extending from the tip to the other end thereof, a heat dissipator on the tube adjacent said other end to dissipate heat transmitted along said tube, a tubular heat resistant glass tube having a smooth bore removably connected to said other end and forming a solder receiving receptacle, means mounting said receptacle on said handle in spaced relation thereto, a source of suction connected to the other end of the receptacle and actuated by a supply of air, and a pedal operated remote control means for controlling said air supply to actuate said source of suction to apply said suction to the receptacle to withdraw any solder softened by the heated tip through the lined tube and deposit it in said receptacle.

3. A solder removing device comprising a handle carrying a heater means provided with a heat transmitting portion having a bore therein, a copper tube, a removable tubular copper tip inserted at one end thereof, said tube and tip having portions disposed within the bore of said heat transmitting portion to be heated thereby, said tube having a corrosion resisting liner therein extending from the tip to the other end thereof, a heat dissipator on the tube adjacent said other end to dissipate heat transmitted along said tube, a cylindrical heat resistant transparent glass tube having a smooth bore provided with removable ends, said tube being connected to said other end and forming a solder receiving receptacle, means removably mounting said receptacle on said handle in spaced relation thereto and said ends being removable to facilitate removal of the solder received therein, with one end being connected to the tube, a source of suction connected to the other end of the receptacle and actuated by a supply of air, and a pedal operated remote control means for controlling said air supply to actuate said source of suction to apply said suction to the receptacle to withdraw any solder softened by the heated tip through the lined tube and deposit it in said receptacle.

4. A solder removing device having a handle carrying an electric heater means provided with a heat transmitting portion having a bore therein provided with a tube receiving socket at one end, a copper tube having one end secured in the socket with the interior of the tube in line with the bore in the heat transmitting portion, a removable tubular copper tip inserted into the tube, said tube and tip having portions disposed within said heat transmitting portion to be heated thereby, said tube having a stainless steel liner therein extending from the tip to the other end thereof, a plurality of radial fins on the tube adjacent said other end to form a heat dissipator to dissipate heat transmitted along said tube, a tubular heat resistant glass tube having a smooth bore connected to said other end and forming a solder receiving receptacle, clamping means removably mounting said glass tube on said handle in spaced relation thereto, an air actuated, vacuum producing means connected to the other end of the receptacle, a supply of air for said last-named means, and a pedal controlled solenoid valve means for controlling said air supply to create a vacuum and apply a suction to the receptacle to withdraw any solder softened by the heated tip through the lined tube and deposit it in said receptacle.

References Cited by the Examiner
UNITED STATES PATENTS

| | | | |
|---|---|---|---|
| 1,189,735 | 7/16 | Quintin | 219—227 |
| 2,609,778 | 9/52 | Bleam et al. | 219—230 X |
| 2,955,188 | 10/60 | Campo | 113—59 |
| 3,024,343 | 3/62 | Siwakoski | 113—59 |
| 3,045,095 | 7/62 | Usher et al. | 113—59 X |

RICHARD M. WOOD, *Primary Examiner.*

ANTHONY BARTIS, *Examiner.*